(12) United States Patent
Kameshima et al.

(10) Patent No.: US 8,163,383 B2
(45) Date of Patent: *Apr. 24, 2012

(54) ANTIGLARE FILM

(75) Inventors: Hisamitsu Kameshima, Tokyo (JP); Yusuke Tochigi, Tokyo (JP)

(73) Assignee: Toppan Printing Co., Ltd. (JP)

( * ) Notice: Subject to any disclaimer, the term of this patent is extended or adjusted under 35 U.S.C. 154(b) by 464 days.

This patent is subject to a terminal disclaimer.

(21) Appl. No.: 12/405,951

(22) Filed: Mar. 17, 2009

(65) Prior Publication Data

US 2009/0244708 A1    Oct. 1, 2009

(30) Foreign Application Priority Data

Mar. 26, 2008    (JP) .................................. 2008-079922

(51) Int. Cl.
*B32B 5/16*    (2006.01)
*B05D 3/02*    (2006.01)

(52) U.S. Cl. ..................................... 428/323; 427/372.2

(58) Field of Classification Search .................. 428/323; 427/372.2

See application file for complete search history.

(56) References Cited

U.S. PATENT DOCUMENTS

| 5,387,463 | A  | * | 2/1995 | Nakamura et al. | ............ | 428/327 |
| 6,217,176 | B1 | * | 4/2001 | Maekawa | ...................... | 359/601 |
| 6,343,865 | B1 | * | 2/2002 | Suzuki | .......................... | 359/601 |
| 2007/0103786 | A1 | * | 5/2007 | Muramatsu | ................... | 359/599 |
| 2011/0085115 | A1 | * | 4/2011 | Tochigi et al. | ................. | 349/96 |

FOREIGN PATENT DOCUMENTS

| JP | 06-018706 | 1/1994 |
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-260748 | 9/2003 |
| JP | 2004-004777 | 1/2004 |

* cited by examiner

*Primary Examiner* — Nathan M Nutter
(74) *Attorney, Agent, or Firm* — Squire Sanders (US) LLP

(57) ABSTRACT

This invention provides an antiglare film which has high antiglare property and show little white-blurring. An embodiment of the present invention is an antiglare film having a binder matrix and particles on a transparent substrate. The binder matrix is an acrylic material. The particles are made of a copolymer of styrene and methyl methacrylate. The copolymerization ratio by weight of the styrene and methyl methacrylate is in the styrene:methacrylic acid=60:40 to 80:20 range. In addition, a quotient R/H, which is obtained by dividing an average diameter of the particles (R) by the average thickness of the antiglare layer (H), is in the 0.45-0.65 range. Moreover, a quotient $w_P/w_B$, which is obtained by dividing a content of the particles in the antiglare layer ($w_P$) by a content of the binder matrix in the antiglare layer ($w_B$) is in the 0.08-0/164.

8 Claims, 4 Drawing Sheets

ANTIGLARE FILM

CROSS REFERENCE TO RELATED APPLICATION

This application is based on and claims the benefit of priority from the Japanese Patent Application number 2008-079922, filed on Mar. 26, 2008, the entire contents of which are incorporated herein by reference.

BACKGROUND OF THE INVENTION

1. Field of the Invention

This invention relates to an antiglare film which is applied on a surface of a window or a display etc. In particular, this invention relates to an antiglare film which is used on a surface of a display such as liquid crystal display (LCD), CRT (Cathode Ray Tube) display, organic electroluminescent display (ELD), plasma display (PDP), surface conduction electron-emitter display (SED) and field emission display (FED) etc.

2. Description of the Related Art

In the field of displays such as LCD, CRT display, ELD and PDP, an arrangement of an antiglare film which has a concave-convex structure on the surface thereof on the display is known as a means for preventing a degradation of visibility caused by reflection of external light on the display surface during viewing.

The following techniques, for example, are known for producing such antiglare films:

a method of forming a concave-convex structure on an antiglare film surface by emboss processing;

a method of coating a coating liquid obtained by admixing particles to a binder matrix forming material and dispersing the particles in the binder matrix, thereby forming a concave-convex structure on an antiglare film surface.

In such antiglare film having on the surface thereof a concave-convex structure formed by the above-described methods, external light falling on the antiglare film is scattered by the concave-convex structure of the surface. As a result, the image of external light becomes smudgy so that the degradation of visibility caused by the reflection of external light on the display surface is prevented.

In the antiglare film in which convexities and concavities have been formed on the surface by emboss processing, surface convexities and concavities can be completely controlled. As a result, reproducibility is good. However, the problem is that when defects or foreign matters are present on the emboss roll, the defects spaced by a roll pitch appear continuously on the film.

On the other hand, the antiglare film using a binder matrix and particles can be produced by using fewer operations than the antiglare film employing the emboss processing. As a result, this type of antiglare film can be manufactured at a low cost. Accordingly, antiglare films of a variety of forms in which particles are dispersed in a binder matrix are known (Japanese Patent Application Publication (JP-A-6-18706) No. 6-18706).

Various techniques have been disclosed with respect to antiglare films using binder matrix and particles. For example, the following methods for producing antiglare films using a binder matrix and particles have been disclosed:

a method using a binder matrix resin, spherical particles, and particles of irregular shape (JP-A-2003-260748);

a method using a binder matrix resin and particles of a plurality of different diameters (JP-A-2004-004777);

a method of using a film having surface convexities and concavities in which the cross-sectional area of convexities is specified (JP-A-2003-004903).

In addition, the following methods have also been disclosed:

a method of using internal scattering in combination with external scattering and setting an internal haze of an antiglare film to 1-15% and a surface haze to 7-30% (JP-A-11-305010);

a method of using a binder resin and particles with a size of 0.5-5 μm and setting the difference in refractive index between the resin and the particles to 0.02-0.2 (JP-A-11-326608);

a method of using a binder resin and particles with a size of 1-5 μm and setting the difference in refractive index between the resin and the particles to 0.05-0.15, and a method in which the properties of the solvent used and the surface roughness are set within the predetermined ranges (JP-A-2000-338310);

a method of using a binder resin and a plurality of particles and setting the difference in refractive index between the resin and the particles to 0.03-0.2 (JP-A-2000-180611);

a method of setting a surface haze to 3 or more and setting the difference between a haze value in the normal direction and a haze value in the direction at ±60° to 4 or less with the object of reducing the variations in hue and the decrease in contrast occurring when the viewing angle changes (JP-A-11-160505).

As described above, various techniques for various purposes have been disclosed. The required properties and performances for an antiglare film which is applied on a frontal surface of a display device depend on the type of the display. In other words, the most desirable antiglare film for a display device differs depending on the display's resolution and intended use etc. Therefore, a wide variety of antiglare films to meet various applications are wanted.

Recently, an antiglare film having (1) a sufficient antiglare property, which makes an image derived from external light smudgy when it falls in the surface of the antiglare layer's side, and showing (2) weaker 'white-blurring', which is observed as whitening phenomenon of the antiglare film when an illumination such as fluorescent light is reflected on the surface of the antiglare layer's side, tends to be preferred. Especially in the case where the antiglare film is applied on the surface of an LCD as TV, the antiglare film is required to have a high level of antiglare property causing a low level of white-blurring phenomenon if any.

The present invention provides an antiglare film having a high level of antiglare property and at the same time causing no significant white-blurring.

SUMMARY OF THE INVENTION

In order to provide such antiglare film, the present invention in accordance with claim 1 discloses an antiglare film having an antiglare layer containing particles within a binder matrix on a transparent substrate. The antiglare film has specific features as follows: The binder matrix is obtained by exposing an acrylic material to ionizing radiation so that it is cured; the particles are made of a copolymer of styrene and methyl methacrylate and the copolymerization ratio by weight is in the (styrene):(methyl methacrylate)=60:40-80:20 range; a quotient R/H, which is obtained by dividing an average diameter of the particles (R) by an average thickness of the antiglare layer (H), is in the 0.45-0.65 range; and a quotient $w_P/w_B$, which is obtained by dividing a content of the particles ($w_P$) in the antiglare layer by a content of the binder matrix ($w_B$) in the antiglare layer, is in the 0.080-0.104 range.

In addition, the present invention described in claim 2 is the antiglare film in accordance with claim 1, wherein the average thickness of the antiglare layer (H) is in the 3-30 μm range.

In addition, the present invention described in claim 3 is the antiglare film in accordance with claim 1, wherein the acrylic material includes a 3-functional acrylate (inc. methacrylate) monomer and/or a 4-functional acrylate (inc. methacrylate) monomer, and the 3-functional acrylate (inc. methacrylate) monomer and/or the 4-functional acrylate (inc. methacrylate) monomer is included more than (or equal to) 80% by weight relative to the binder matrix.

In addition, the present invention described in claim 4 is the antiglare film in accordance with claim 1, wherein the antiglare film has an antireflection layer on the antiglare layer.

In addition, the present invention in accordance with claim 5 is a manufacturing method of an antiglare film having an antiglare layer containing particles within a binder matrix on a transparent substrate. And the manufacturing method of an antiglare film has specific features as follows: There is a processing step of producing a coating film by coating on a transparent substrate a coating liquid for forming an antiglare layer that contains a binder matrix forming material, particles which is made of a copolymer of styrene and methyl methacrylate and has a copolymerization ratio by weight in the (styrene):(methyl methacrylate)=60:40 to 80:20 range, and a solvent, and takes a quotient $w_P/w_B$ in the 0.080-0.104 range, wherein this coating on a transparent substrate is performed in a way that a quotient R/H becomes in the 0.45-0.65 range, and further, the quotient $w_P/w_B$ is obtained by dividing a content of the particles ($w_P$) in the coating liquid for forming an antiglare layer by a content of the binder matrix forming material ($w_B$) in the coating liquid for forming an antiglare layer and the quotient R/H is obtained by dividing an average diameter of the particles (R) by an average thickness of the antiglare layer (H); There are also a processing step of drying this coating film to remove solvent and a processing step of exposing the coating film to ionizing radiation so that the coating film may cure or harden.

In addition, the present invention described in claim 6 is a manufacturing method of the antiglare film in accordance with claim 5, wherein the average thickness (H) of the antiglare film after it is cured is in the 3-30 μm range.

Meanwhile, the present invention described in claim 7 is a manufacturing method of the antiglare film in accordance with claim 5, wherein the transparent substrate is chiefly made of a triacetyl cellulose film, and a solvent that is contained in the coating liquid for forming an antiglare layer includes both of a solvent in which a triacetyl cellulose film dissolves or swells and a solvent in which a triacetyl cellulose film does not dissolve or swell.

Meanwhile, the present invention described in claim 8 is a manufacturing method of the antiglare film in accordance with claim 5, wherein a process in which the acrylic material is exposed to ionizing radiation so that it is cured is performed with an oxygen concentration less than (inc. equal to) 2.0%.

An antiglare film having a constitution described above achieves a high level of antiglare property and suppresses white-blurring to be preferably applied on a surface of a television LCD.

Figure 1:
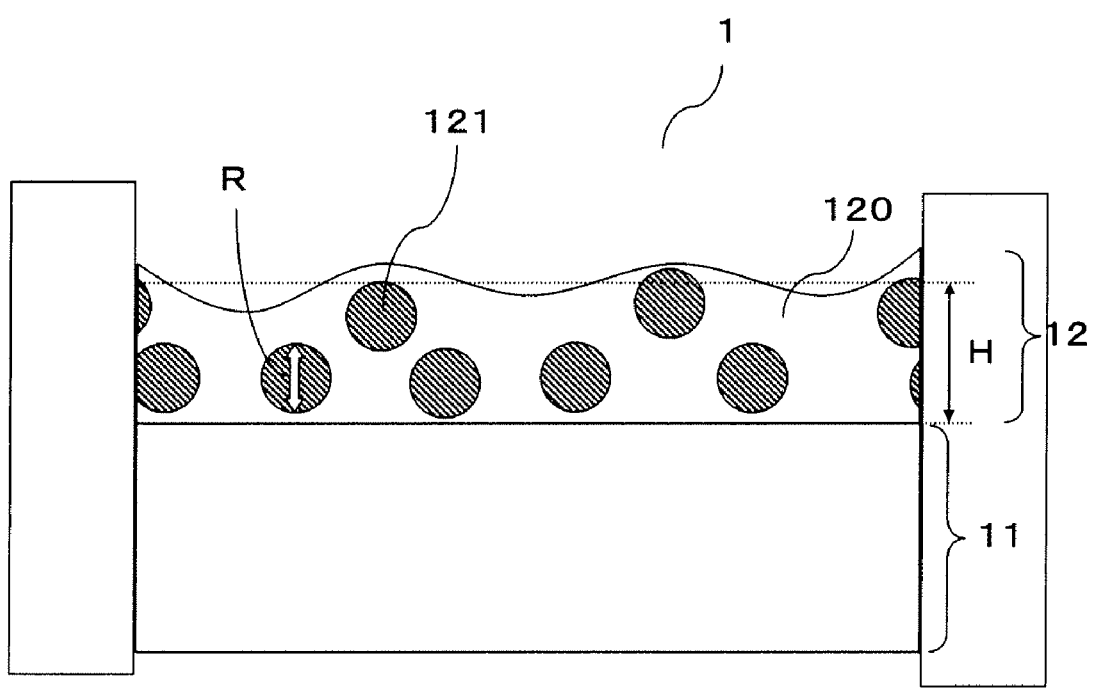
FIG. 1 shows a cross sectional diagram of an antiglare film of the present invention.

| [Description of Reference Numerals and Signs] | |
|---|---|
| 1: | Antiglare film |
| 1': | Antiglare film |
| 11: | Transparent substrate |
| 12: | Antiglare layer |
| 120: | Binder matrix |
| 121: | Particles |
| R: | Average diameter of particles |
| H: | Average thickness of antiglare layer |
| 13: | Antireflection layer |
| 2: | Polarizing plate |
| 21: | Transparent substrate |
| 22: | Transparent substrate |
| 23: | Polarizing layer |
| 3: | Liquid crystal cell |
| 41: | Transparent substrate |
| 42: | Transparent substrate |
| 43: | Polarizing layer |
| 5: | Backlight unit |
| 30: | Die head |
| 31: | Pipework |
| 32: | Tank of coating liquid |
| 33: | Liquid transfer pump |
| 35: | Rotary roll |

DETAILED DESCRIPTION OF THE INVENTION

The antiglare film of the present invention is described below.

FIG. 1 shows an exemplary cross-sectional diagram of the antiglare film of the present invention. The antiglare film (1) of the present invention has an antiglare layer (12) on a transparent substrate (11). The antiglare layer (12) of the antiglare film (1) of the present invention includes particles (121) made of a copolymer of styrene and methyl methacrylate within the binder matrix (120) mainly made from acrylic materials.

It is a feature of the present invention that the binder matrix is produced by exposing an acrylic material to ionizing radiation. Polyfunctional acrylate (or methacrylate) monomers such as a polyol ester of acrylic (or methacrylic) acid, polyfunctional urethane acrylates (or methacrylates) as synthesized from a diusocyanate and a hydroxyl ester of a polyol and an acrylic or methacrylic acid, polyester resins, epoxy resins, alkyd resins, spiroacetal resins, polybutadiene resin, polythiol polyen resins, and polyether resins which incorporate an acrylate or methacrylate group can be used as the acrylic material. These acrylic materials are ionizing radiation curable. Thus they are cured by an exposure to ultraviolet ray or an electron beam etc. organizing a three dimensional net structure so that they form a hard coat film. Hence they can be made into a sufficiently hard film to be applied on a display surface.

In this document, an expression such as "acrylic (or methacrylic)" means acrylic and/or methacrylic. For example, "urethane acrylates (or methacrylates)" refer to urethane acrylates and/or urethane methacrylates.

The binder matrix in this document means components of the antiglare layer except for particles. The antiglare film in the present invention is produced by coating a coating liquid for forming an antiglare layer on the transparent substrate. A binder matrix forming material in this invention refers to a solid content excluding particles out of the coating liquid for forming an antiglare layer. Therefore, the binder matrix forming material may include a thermoplastic resin and additives such as a photopolymerization initiator and a surface conditioner etc. if necessary besides an acrylic material.

It is a feature of this invention that the particles are made from a copolymer of styrene and methyl methacrylate (MMA). A dispersion of the particles made from a copolymer of styrene and MMA in the binder matrix, which is chiefly made from acrylic materials, can be controlled by adjusting the copolymerization ratio. If the MMA component increases in the particles made from a copolymer of styrene and MMA, the particles tend to be sufficiently dispersed in the binder matrix because the MMA component blends in to acrylic materials. On the contrary, if the styrene component increases in the particles made from a copolymer of styrene and methyl methacrylate, the particles tend to agglutinate in the binder matrix.

It is a feature of the antiglare film of the present invention that the binder matrix forming material is an acrylic material, the particles are made of a copolymer of styrene and MMA, and further (a) the copolymerization ratio by weight of styrene and MMA (styrene:MMA) in the particles is in the 60:40 to 80:20 range; (b) a quotient R/H, which is obtained by dividing the average diameter of the particles (R) by the average thickness of the antiglare layer (H) is in the 0.45-0.65 range; and (c) a quotient $w_P/w_B$, which is obtained by dividing the content of the particles ($w_P$) in the antiglare layer by the content of the binder matrix ($w_B$) in the antiglare layer is in the 0.080-0.104 range. It is a feature of the antiglare film of this invention that all numeral conditions specified in (a), (b) and (c) are satisfied.

It is a feature of this invention that (a) the copolymerization ratio by weight of styrene and MMA (styrene:MMA) in the particles is in the 60:40 to 80:20 range. If the MMA ratio in the particles made from the copolymer is higher than 60:40, the concavities and convexities formed on the surface of the antiglare layer becomes too small because of the high solubility of the particles to the binder matrix even when the conditions (b) and (c) are satisfied. As a result, the antiglare property decreases, which makes it impossible to sufficiently prevent external light from falling in the antiglare film. On the other hand, the styrene ratio in the particles made from the copolymer is higher than 80:20, the particles are clump together in the acrylic binder matrix material because of the low solubility of the particles even if the conditions (b) and (c) are satisfied. Then, excessive concavities and convexities are formed on the surface of the antiglare layer resulting in an occurrence of white-blurring.

It is a feature of the present invention that (b) the quotient R/H obtained by dividing the average diameter of the particles (R) by the average thickness of the antiglare layer (H) is in the 0.45-0.65 range. In the case where the R/H is less than 0.45, it is difficult to produce concavities and convexities in the surface of the antiglare layer even when the conditions (a) and (c) are satisfied. As a result, the antiglare properties decreases and it becomes impossible to sufficiently prevent external light from falling in the antiglare film. On the other hand, in the case where the R/H is more than 0.65, large convexities are produced on the surface of the antiglare layer. Then, even when the conditions (a) and (c) are satisfied, concave-convex structure of the surface of the antiglare layer becomes excessive resulting in an occurrence of a white-blurring.

It is noted that the average thickness of the antiglare layer (H) of the present invention refers to an average value in thickness of the antiglare layer having concavities and convexities on the surface thereof. The average thickness can be measured with an electronic micrometer or automated micro-geometry measurement equipment. The average diameter of the particles in the present invention can be measured with a light scattering particle size analysis system.

It is a feature of the present invention that (c) a quotient $w_P/w_B$ obtained by dividing the content of the particles in the antiglare layer ($w_P$) by the content of the binder matrix in the antiglare layer ($w_B$) is in the 0.080-0.104 range. In the case where the $w_P/w_B$ is less than 0.080, it becomes difficult to produce concave-convex structure on the surface of the antiglare layer even when the conditions (a) and (b) are satisfied. Then, the antiglare property decreases and it becomes impossible to sufficiently prevent external light from falling in the antiglare film. Meanwhile, in the case where the $w_P/w_B$ is more than 0.104, the concave-convex structure produced with the organic particles tends to be excessive resulting in an occurrence of white-blurring even when the condition (a) and (b) are satisfied. In the present invention $w_B$, the content of the binder matrix, which is chiefly made from an acrylic material, in the antiglare layer means a weight value which is obtained by subtracting a weight of the organic particles from a weight of the entire antiglare layer.

The antiglare film of this invention uses the particles having the R/H in the 0.45-0.65 range and the $w_P/w_B$ in the 0.08-0.104 range. In addition, in this invention the antiglare film uses a binder matrix chiefly made of an acrylic material and particles made from a copolymer of styrene and MMA and the copolymerization ratio of the antiglare film is specified so as to provide the antiglare film with high antiglare properties and avoid an occurrence of white-blurring.

In the antiglare film of the present invention the particles have a diameter equal to about half the average thickness of the antiglare layer and the antiglare layer includes particles as little in weight as around one tenth the amount of the binder matrix. Thus, an excessive concave-convex structure, which causes an occurrence of white-blurring, is not formed on the surface of the antiglare layer. In addition, the concave-convex structure on the antiglare layer surface is effectively produced by controlling the dispersion property of the copolymer of styrene and MMA as the particles. In this way, the antiglare film of the present invention provides with high antiglare properties and reduces the occurrence of the white-blurring It is preferable that the H, the average thickness of the antiglare layer is in the 3-30 μm range in the antiglare film of the present invention. In the case where the H is thinner than 3 μm, the antiglare film sometimes lacks sufficient hardness to be applied on a surface of a display device. Meanwhile, in the case where the H is thicker than 30 μm, the costs are high and the antiglare film sometimes curls up too much to receive fabrication process to be arranged on a display surface. Specifically it is more preferable that the H, the average thickness of the antiglare layer is in the 4-20 μm range.

In addition, it is preferred that the acrylic material includes 80 parts by weight of 3-functional acrylate (or methacrylate) monomers and/or 4-functional acrylate (or methacrylate) monomers relative to 100 parts by weight of the binder matrix in the antiglare film of the present invention. 80 parts by weight or more of 3-functional acrylate (or methacrylate) monomers and/or 4-functional acrylate (or methacrylate) monomers provide sufficient surface hardness to the antiglare layer. These 80 parts by weight of 3-functional acrylate (or methacrylate) monomers and/or 4-functional acrylate (or methacrylate) monomers may be of only a single kind of monomers or a plurality of kinds of monomers.

If necessary, a functional layer having antireflection property, antistatic property, antifouling property, electromagnetic shielding property, infrared absorption property, ultraviolet absorption property and/or color compensation property etc. is arranged in the antiglare film of the present invention. An antireflection layer, an antistatic layer, an antifouling layer, an electromagnetic shielding layer, an infrared absorption layer, an ultraviolet absorption layer and a color compensation layer etc. are exemplified as the functional layer. The functional layer may have a single layer structure or a multilayer structure. The functional layer may have not only a single function but also multiple functions within a single layer such as an antifouling antireflection layer. In addition, the functional layer can be arranged on the antiglare layer or between the antiglare layer and the transparent substrate. Furthermore, a primer layer or an adhesive layer etc. can be arranged between any layers in order to improving the adhesiveness between layers in the present invention.

Figure 2:
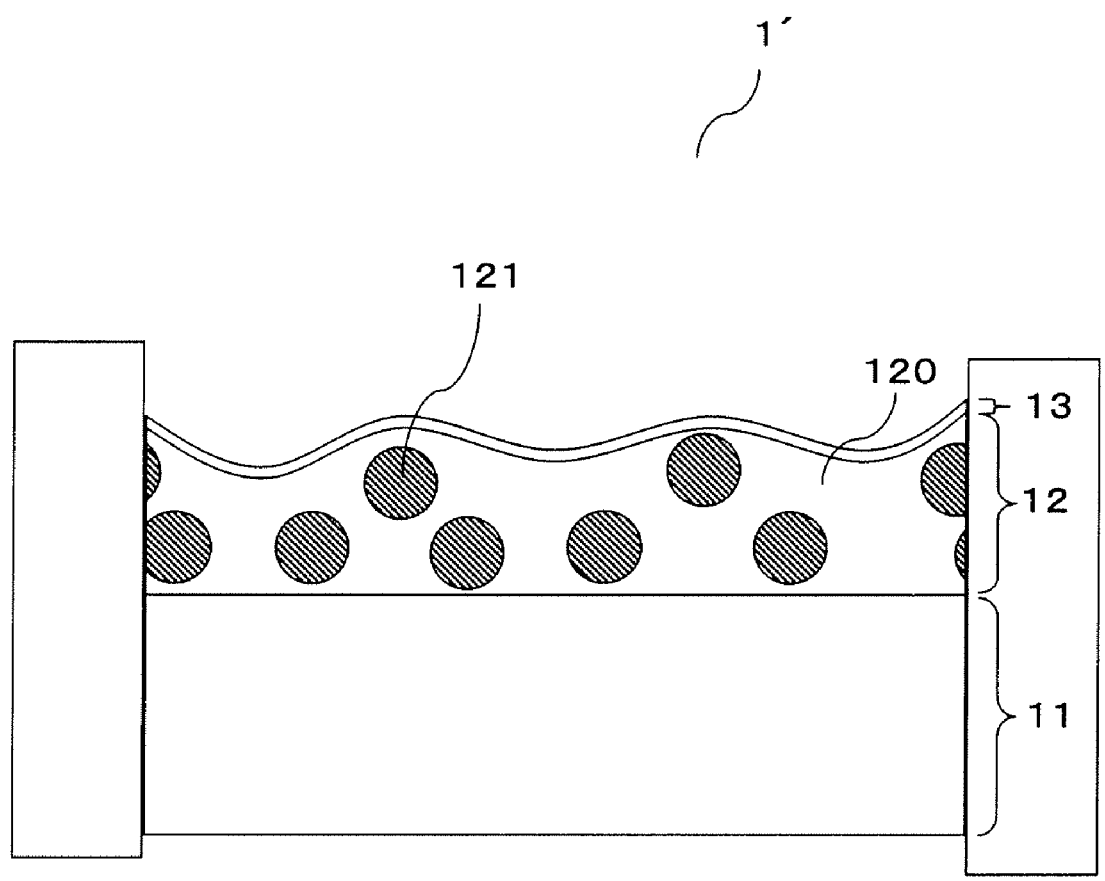
FIG. 2 shows a cross sectional diagram of an antiglare film of another embodiment of the present invention.

FIG. 2 shows a schematic cross section diagram of another embodiment of the present invention. This embodiment of the antiglare film of the present invention (1') has an antireflection layer (13) on the antiglare layer (12) which is formed on the transparent substrate (11). It becomes possible to further reduce reflection of external light falling in the antiglare film surface by arranging the antireflection layer on the antiglare layer. The antiglare layer combined with the antireflection layer not only scatters external light by the concave-convex structure of the antiglare layer but also prevent external light from falling in the antiglare film by an interference effect of the antireflection layer. The antireflection layer may be composed of a single layer with low refractive index or a multilayer repeating low and high refractive index.

Figure 3A:
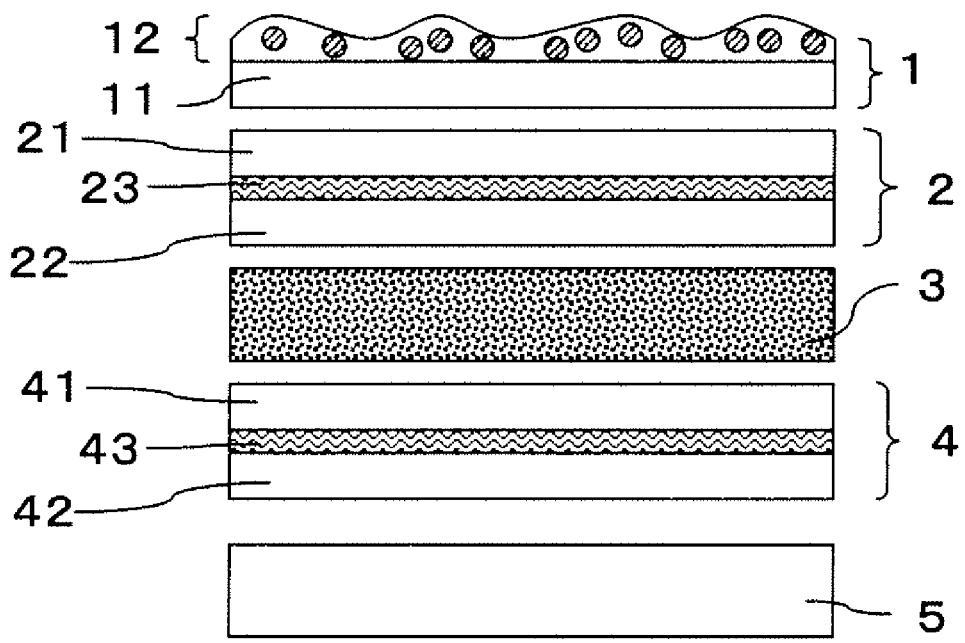
FIG. 3 is a transmission type LCD using the antiglare film of the present invention.

FIG. 3 is a transmission type LCD employing the antiglare film of the present invention. The transmission type LCD in FIG. 3A has a back light unit (5), a polarizing plate (4), a liquid crystal cell (3), another polarizing plate (2) and the antiglare film (1) in the order of this description. At this time, the surface of the display, namely, the observer's point is the antiglare film (1) side.

The back light unit (5) includes a light source and a light diffusion plate. The liquid crystal cell (3) has two transparent substrates. An electrode and a color filter are arranged on one of the transparent substrates and another electrode is arranged on the other substrate. A liquid crystal is inserted in the electrodes. Each of two polarizing plates which sandwich the liquid crystal cell (3) has a polarizing layer (23, 43) between two transparent substrates (21, 22, 41, 42)

Figure 3B:
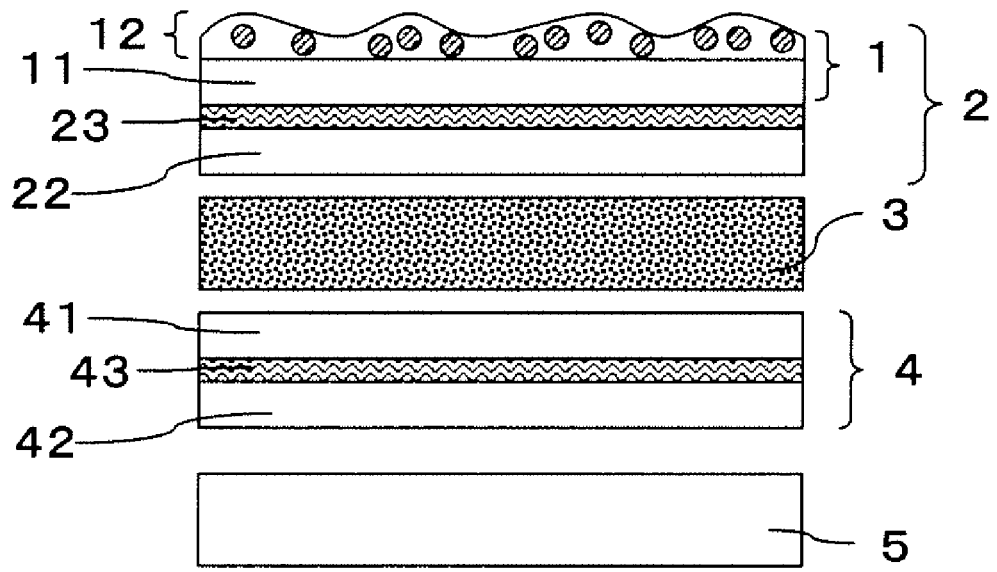

FIG. 3A shows a transmission type LCD in which the transparent substrate (11) of the antiglare film (1) is separated from that of the polarizing plate (2). Meanwhile, FIG. 3B shows a transparent substrate (11) shared by the antiglare film (1) and the polarizing plate (2). The polarizing layer (23) is arranged on the opposite side of the transparent substrate (11) of the polarizing plate (1) from the antiglare layer, and hence, there are the polarizing layer and the other transparent substrate on the opposite side of the transparent substrate of the polarizing plate (1) from the antiglare layer's side.

In addition, the transmission type LCD of the present invention may incorporate other functional components. Examples of such functional components are a diffusion film, a prism sheet and a luminance increasing film, which make it possible to efficiently utilize light from the back light unit, and a retardation film, which compensates a phase difference caused by a liquid crystal cell and/or a polarizing plate. However, the transmission type LCD of the present invention is never limited to these examples.

Next, a manufacturing process of the antiglare film of the present invention is described.

The antiglare film of the present invention can be produced on a transparent substrate by performing a first process that a coating liquid for forming an antiglare layer, which contains at least a solvent, a binder matrix forming material, which includes a kind of acrylic material and curable by ionizing radiation, and particles made of copolymer of styrene and MMA, is coated on the transparent substrate followed by a second process that the coated film is dried to remove the solvent therein and a third process that the binder matrix forming material is exposed to ionizing radiation to be cured.

A glass and a plastic film etc. can be used as the transparent substrate of the present invention. The plastic film should have an adequate transparency and mechanical strength. For example, a film of polyethylene terephthalate (PET), triacetyl cellulose (TAC), diacetyl cellulose, acetyl cellulose butylate, polyethylene naphthalate (PEN), a cycloolefin polymer, a polyimide, polyether sulfone (PES), polymethyl methacrylate (PMMA), or a polycarbonate (PC) etc. can be used as the transparent substrate. TAC is preferred to be used among them because of its small birefringence and good transparency. Especially in the case where the antiglare film of the present invention is applied on a surface of an LCD, TAC is desirable as the transparent substrate.

It is also possible that a polarizing layer is arranged on the other side of the transparent substrate from the side that the antiglare layer is arranged as is shown in FIG. 3B. An example of the polarizing layer can be a stretched polyvinyl alcohol (PVA) film to which iodine is added. A polarizing plate can be produced by arranging the polarizing layer between transparent substrates.

The coating liquid for forming an antiglare layer contains at least particles and a binder matrix forming material which includes acrylic material. Polyfunctional acrylates such as acrylic (or methacrylic) acid ester of polyol, and polyfunctional urethane acrylates (or methacrylates) which are synthesized from diisocyanate and acrylic or methacrylic acid hydroxyester etc. of polyol can be used as the acrylic material of the binder matrix forming material. Besides these, a polyester resin, an epoxy resin, an alkyd resin, a spiroacetal resin, polybutadiene resin, a polytholpolyene resin, and a polyether resin etc. which have an acrylic (or methacrylic) group can be used as an ionizing radiation type material. These ionizing radiation type acrylic materials form a three-dimensional net structure and become cured so that they acquire a high level of hard coat property when they are exposed to an electron beam or ultraviolet light.

3-functional acrylate (or methacrylate) monomers and 4-functional acrylate (or methacrylate) monomers are especially preferred to be used as the acrylic material. The use of 3-functional acrylate (or methacrylate) monomers or 4-functional acrylate (or methacrylate) monomers provides the antiglare films with sufficient abrasion resistance.

The 3-functional acrylate (or methacrylate) monomers and the 4-functional acrylate (or methacrylate) monomers referred to 3-functional monomers and 4-functional monomers out of polyfunctional acrylate monomers such as acrylic or methacrylic acid esters of polyol, or polyfunctional urethane acrylate monomers which are synthesized from diisocyanate and hydroxyesters of polyol and acrylic or methacrylic acid. A sum of 3-functional acrylate monomers and 4-functional acrylate monomers are preferably 80 wt % or more within 100 wt % of the binder matrix forming material.

Triacrylates (or methacrylates) such as trimethylolpropane triacrylate (or methacrylate), ethoxylated trimethylolpropane triacrylate (or methacrylate), propoxylated trimethylolpropane triacrylate (or methacrylate), tris 2-hydroxyethyl isocyanate triacrylate (or methacrylate), glycerol triacrylate (or methacrylate) etc., pentaerythritol triacrylate (or methacrylate), dipentaerythritol triacrylate (or methacrylate), and ditrimethylolpropane triacrylate (or methacrylate) etc. can be used as the 3-functional acrylate (or methacrylate) monomers. Pentaerythritol tetraacrylate (or methacrylate), ditrimethylolpropane tetraacrylate (or methacrylate), and dipentaerythritol tetraacrylate (or methacrylate) etc. can be used as the 4-functional acrylate (or methacrylate) monomers.

Other than these, a compound which is obtained by a reaction of a polyol, a multivalent isocyanate and an acrylate having a hydroxyl group can be employed as the urethane acrylate (or methacrylate), which is used as the acrylic material. Specifically, UA-306H, UA-306T and UA-306I etc. manufactured by KYOEISHA Chemical Co., Ltd. UV-1700B, UV-6300B, UV-7600B, UV-7605B, UV-7640B and UV-7650B etc. manufactured by Nippon Synthetic Chemical Industry Co., Ltd. U-4HA, U-6HA, UA-100H, U-6LPA, U-15HA, UA-32P and U-324A etc. manufactured by Shin-Nakamura Chemical Co., Ltd. Ebecryl-1290, Ebecryl-1290K and Ebecryl-5129 etc. manufactured by Daicel UCB Company Ltd. UN-3220HA, UN-3220HB, UN-3220HC and UN-3220HS etc. manufactured by Negami Chemical Industrial Co., Ltd. can be used.

In addition, in the case where ultraviolet light is employed as the ionizing radiation, a photopolymerization initiator is added to the coating liquid for forming an antiglare layer. Although any photopolymerization initiator belonging to public domain can be used as the photopolymerization initiator, it is more preferable that the photopolymerization initiator suitable for the acrylic binder matrix forming material is used. Benzoin and its alkyl ethers etc. such as benzoin methyl ether, benzoin ethyl ether, benzoin isopropyl ether and benzil dimethyl ketal can be used as the photopolymerization initiator. The photopolymerization initiator usage relative to the amount of the binder matrix forming material which is made from acrylic material is in the 0.5-20 wt % range. More preferably, it is in the 1-5 wt % range.

Additives such as a surface conditioner may be used in the present invention in order to prevent an occurrence of defects such as repellency and unevenness in the antiglare layer which is made by coating the coating liquid for forming an antiglare layer. The surface conditioner reduces the surface tension of the coated film (the antiglare layer) and may be also referred to a leveling agent, an antifoamer, an interfacial tension conditioner, or a surface tension conditioner.

Silicone series additives, fluorine series additives, and acrylic additives are ordinary used as the surface conditioner. The silicone series additives are derivatives having a basic structure of polydimethyl cyclohexane and are modified in the polydimethyl cyclohexane side chain. For example, polyether modified dimethyl cyclohexane is used as the silicone series additives. Similarly, compounds having a perfluoro alkyl group are used as the fluorine series additives.

Moreover, additives other than the surface conditioner may also be added to the coating liquid for forming an antiglare layer of the present invention. It is preferable, however, that these additives have no influence on transparency and diffusion property etc. of the antiglare layer. Antistatic, ultraviolet absorber, infrared absorber, antifoulant, water repellant, refractive index modifier, adhesiveness improver, and curative agent, which provide the antiglare layer with functions other than antiglare property such as antistatic property, ultraviolet absorbing property, infrared absorbing property, antifouling property, and water repellency etc., can be used as functional additives.

Furthermore, thermoplastic resins etc. besides acrylic materials, which are cured by ionizing radiation, can also be added to the binder matrix forming materials. Cellulose derivatives such as acetyl cellulose, nitro cellulose, acetyl butyl cellulose, ethyl cellulose, and methyl cellulose etc., vinyl resins such as vinyl acetate and its copolymers, vinyl chloride and its copolymers, vinylidene chloride and its copolymers etc., acetal resins such as polyvinyl formal, polyvinyl butyral etc., acrylic resins such as acrylate resins and their copolymers, methacrylate resins and their copolymers etc., polystyrene resin, polyamide resins, linear polyester resins, and polycarbonate resin etc. can be used as the thermoplastic resins.

Particles of a copolymer of styrene and PMMA which has copolymerization ratio in the 60/40-80/20 range can be used as the particles of the present invention. Copolymer particles of styrene and PMMA can be obtained by suspension copolymerization with styrene and methyl methacrylate (MMA) as monomers. Copolymer particles of styrene and PMMA with various weight ratios can be obtained by controlling the weight ratio of the raw styrene and PMMA.

It is a feature of the present invention that a quotient $w_P/w_B$, which is obtained by dividing a content of the particles in the coating liquid for forming an antiglare layer ($w_P$) by a content of the binder matrix forming material in the coating liquid for forming an antiglare layer ($w_B$) is in the 0.08-0.104 range. It is noted that in the present invention the content of the binder matrix forming material is as much as the content of the binder matrix. Thus, the content of the binder matrix $w_B$ means the content of the binder matrix forming material.

The coating liquid for forming an antiglare is added by a solvent. The solvent enables organic particles and acrylic binder matrix to be evenly dispersed and it also becomes possible to adjust the viscosity of the coating liquid within an appropriate range.

In the case where triacetyl cellulose is employed as the transparent substrate and the antiglare layer is formed directly on the triacetyl cellulose, it is preferred that a mixture of solvents in which triacetyl cellulose is dissolved or swollen and in which triacetyl cellulose is not dissolved or swollen is employed as a solvent of the coating liquid for forming an antiglare layer. By using such mixture of solvent, an antiglare film with sufficient adhesiveness between the triacetyl cellulose and the antiglare layer is obtained.

Ethers such as dibutyl ether, dimethoxymethane, dimethoxyethane, diethoxyethane, propylene oxide, dioxane, dioxorane, trioxane, tetrahydrofuran, anisole and phenetol etc., certain kind of ketones such as acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl formate and γ-butyrolactone etc., and cellosolves such as methyl cellosolve, cellosolve, butyl cellosolve and cellosolve acetate etc. are examples of the solvent in which triacetyl cellulose is dissolved or swollen. While each of these materials alone can be used as the solvent, a mixture of two or more out of these can also be used as the solvent.

Meanwhile, aromatic hydrocarbons such as toluene, xylene and cyclohexyl benzene etc., hydrocarbons such as n-hexane and cyclohexane etc., certain kind of ketones such as methyl isobutyl ketone and methyl butyl ketone etc. are examples of the solvent in which triacetyl cellulose is not dissolved or swollen. Each of these solvents or any combination out of these can be used as the solvent.

The coating liquid for forming an antiglare layer is coated on the transparent substrate to produce a coating film. A coating technique using a roll coater, a reverse roll coater, a gravure coater, a knife coater, a bar coater, or a die coater can be employed for coating the coating liquid for forming an antiglare layer. Among these, it is preferable that the coating technique using a die coater, which makes roll-to-roll coating with a high rate possible, is employed. In addition, a solid content concentration of the coating liquid depends on the coating technique. The solid content concentration, however, will be around 30-70 weight %.

At this point, the coating liquid for forming an antiglare layer is coated in a way that a quotient R/H, which is obtained by dividing an average diameter of the particles (R) by an average thickness of the antiglare layer (R), becomes in the 0.45-0.65 range.

Figure 4:
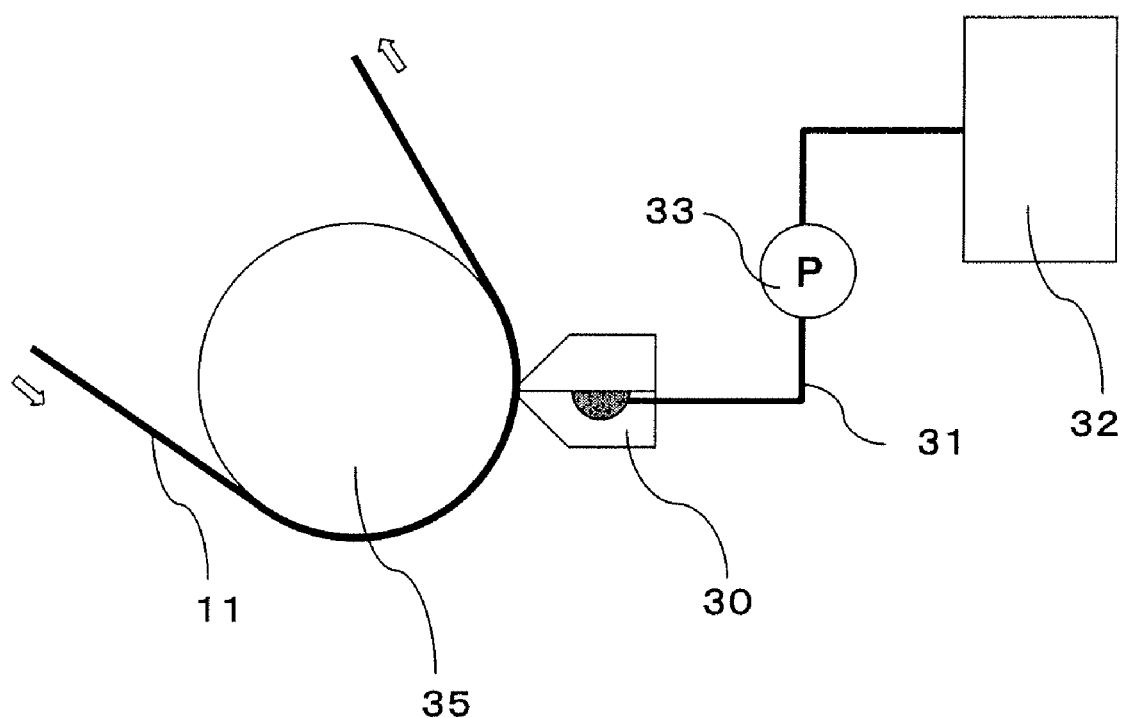
FIG. 4 illustrates exemplary diagram of the coating machine using die coater of the present invention.

Next, the die coating machine of the present invention is described below. An exemplary diagram of the die coating machine of the present invention is showed in FIG. 4. The die coating machine of the present invention has a die head 30 and a tank of coating liquid 32 connected together with a pipework 31 so that the coating liquid for forming an antiglare layer in the tank of coating liquid 32 is delivered into the die head 30 by a liquid transfer pump 33. The coating liquid for forming an antiglare layer delivered to the die head 30 is spitted up from a slit and a coating film is produced on the transparent substrate 11. The coating film can be continuously formed in a roll-to-roll system by using a wind-up transparent substrate 11 and rotary roll 35, feeding continuous web-form transparent substrate.

The coated film on the transparent substrate is dried so that the solvent in the coated film is removed. Heating, sending air or hot air are examples of the drying process.

After the drying process, the coating film is exposed to ionizing radiation to cure the binder matrix forming material and the antiglare layer is produced. Ultraviolet light and electron beams are used as the ionizing radiation. In the case where ultraviolet light is used, a high pressure mercury lamp, a low pressure mercury lamp, an ultra-high pressure mercury lamp, a metal halide lamp, carbon arc or xenon arc can be used as a light source. In the case where electron beams are used, electron beams from various electron accelerators such as Cockcroft-Walton accelerator, van de Graaff accelerator, resonant transformer accelerator, insulated core transformer accelerator, linear accelerator, dynamitron accelerator, or high frequency accelerator can be used. The electron beams are preferred to have energy of 50-1000 keV. It is more preferable if the electron beams have energy in the 110-300 keV range.

The ionizing radiation exposure process is preferred to be performed under an atmosphere of oxygen concentration less than 2.0%. Antiglare film with sufficient surface hardness is obtained if the film receives the ionizing radiation exposure process under an atmosphere of oxygen concentration less than 2.0%. In practical, the ionizing radiation exposure process is desirably performed in a space purged and filled with an inactive gas. If the oxygen concentration is more than 2.0%, it is difficult to maintain sufficient hardness on a surface of the antiglare layer because of oxygen inhibition (inhibition of polymerization of curing agent by oxygen).

The antiglare film of the present invention can be manufactured in the way described above.

Next, methods for producing an antireflection layer of an antiglare film which has an antireflection layer as a functional layer on the antiglare layer as is shown in FIG. 2 are described. An antireflection layer of a single layer with a low refractive index, or an antireflection layer of a stacking structure repeating low and high refractive indexes are examples of the antiglare layer. In addition, producing methods of the antireflection layer can be classified into following two types: wet coating method, in which a coating liquid for forming an antireflection layer is coated on the antiglare layer to form the antireflection layer, and vacuum deposition method, in which the antireflection layer is produced under vacuum like sputtering method or CVD method etc.

A method for forming a single low refractive index layer as an antireflection layer by wet coating method, in which a coating liquid for forming an antireflection layer is coated on the antiglare layer, will be described. At this time, a film thickness (d) of the single low refractive index layer as the antireflection layer is designed in a way that an optical film thickness (nd), which is obtained by multiplying the film thickness (d) by the refractive index (n) of the film, becomes one fourth the wave length of visible light. The low refractive index layer can be produced with a binder matrix combined with low refractive index particles dispersed therein.

At this time, particles of low refractive index material such as magnesium fluoride, calcium fluoride and silica etc. can be used as the low refractive index particles. Meanwhile, polyfunctional acrylates (or methacrylates) such as a polyol ester of acrylic (or methacrylic) acid, or polyfunctional urethane acrylates (or methacrylates) such as a compound synthesized from a diisocyanate, a polyol and acrylic (or methacylic) acid, which are cured by an exposure to ionizing radiation, can be used as the binder matrix forming material. Besides these, other materials such as polyether resins, polyester resins, epoxy resins, alkid resins, spiroacetal resins, polybutadien resin, polythiol polyen resins etc. which include an acrylic functional group are available as an ionizing radiation curable acrylic material. If these ionizing radiation curable acrylic materials are used in the binder matrix, the binder matrix can be formed by an exposure to ionizing radiation such as ultraviolet ray or electron beams. Moreover, metal alkoxides or silicon alkoxide such as tetramethoxysilane and tetraethoxysilane etc. can be used as the binder matrix forming material. These are made to be an inorganic (or organic inorganic hybrid) binder matrix by hydrolysis or dehydrocondensation.

In addition, it is possible to produce the low refractive index layer not only from the binder matrix combined with the low refractive index particles dispersed therein but also from a low refractive index fluorine-series organic material which is not necessary includes low refractive index particles.

The coating liquid for forming a low refractive index layer which includes these low refractive index material and the binder matrix forming material is coated on a surface of the antiglare layer. At this time, it is possible to add a solvent or various additives to the coating liquid for forming a low refractive index layer if necessary. The solvent is, for example, aromatic hydrocarbons such as toluene, xylene and cyclohexylbenzene etc., hydrocarbons such as n-hexane or cyclohexane etc., ethers such as dibutyl ether, dimethoxymethane, dimethoxyethane, diethoxyethane, propylene oxide, dioxane, dioxolan, trioxolan, tetrahydrofuran, anisole or phenetol etc. ketones such as methyl isobutyl ketone, methyl butyl ketone, acetone, methyl ethyl ketone, diethyl ketone, dipropyl ketone, diisobutyl ketone, cyclopentanone, cyclohexanone or methyl cyclohexanone etc., esters such as ethyl formate, propyl formate, n-pentyl formate, methyl acetate, ethyl acetate, methyl propionate, ethyl propionate, n-pentyl acetate or γ-butylolactone etc., cellosolves such as methyl cellosolve, cellosolve, butyl cellosolve or cellosolve acetate etc., alcohols such as methanol, ethanol or isopropyl alcohols etc., or water etc. and is chosen in accordance with suitability for coating etc. Moreover, additives such as a surface conditioner, an antistatic agent, an antifouling agent, a repellant, a refractive index adjuster, an adhesiveness improving agent and a curing agent may be added to the coating liquid.

A coating technique using a roll coater, a reverse roll coater, a gravure coater, a knife coater, a bar coater, or a die coater can be employed for coating the coating liquid for forming an antiglare layer.

When an ionizing radiation curing material is employed as the binder matrix forming material, the coating liquid coated on the transparent substrate is dried if necessary. Then, the antireflection layer is formed by exposing the coated liquid to ionizing radiation. In the case where metal alkoxide is employed as the binder matrix forming material, the antireflection layer is formed by drying and heating etc.

Meanwhile, the antireflection layer can have a stacking structure repeating low and high refractive index layers. For example, the antireflection layer may be produced by forming a titanium oxide layer as a high refractive layer, a silicon oxide layer as a low refraction layer, a titanium oxide layer as a high refractive layer, and a silicon oxide layer as a low refraction layer in the order of this description from the antiglare layer side by a vacuum deposition technique.

In addition, in the case where an antistatic layer is arranged as a functional layer in the antiglare film, the antistatic layer can be formed in any of the following ways: a method of forming a layer of conductive material such as metal or metal oxide etc. by vacuum deposition; or a method of forming a layer of conductive material such as metal or metal oxide etc. by coating a coating liquid in which a conductive material is dispersed within a binder matrix material.

EXAMPLES

Examples are described below.

Example 1

A triacetyl cellulose film (TD-80U manufactured by Fuji Photo Film Corp.) was used as the transparent substrate. The binder matrix forming material was prepared from 94.5 parts by weight of pentaerythritol triacrylate as an acrylic material, 5 parts by weight of Irgacure 184 as a photopolymerization initiator, and 0.5 parts by weight of BYK350 as a surface conditioner. Particles made from a copolymer of 70% of styrene and 30% of methyl methacrylate were prepared as the particles. Furthermore, a combined solvent of 70% of toluene and 30% of dioxolan was prepared as the solvent. Then, the binder matrix forming material, the particles and the solvent were mixed together so as to obtain the coating liquid for forming an antiglare layer. This coating liquid was coated on the triacetyl cellulose film with a coating machine employing a dye coater and dried to remove the solvent. Subsequently, the coated liquid was exposed to 400 mJ/cm$^2$ of ultraviolet light under an atmosphere with an oxygen concentration less than (inc. equal to) 0.03% using high pressure mercury in order to be cured. As a result, the antiglare film having the antiglare layer on the transparent substrate was obtained. An average thickness (H) of the antiglare layer was 7.6 μm.

The average thickness (H) of the antiglare layer was measured with an electronic micrometer (K351C manufactured by Anritsu Company). Meanwhile, the average diameter of the organic particles was measured with a light scattering type particle size distribution analyzer (SALD-7000 made by Shimadzu Corp.). In addition, each refractive index of the particles and the binder matrix was measured. The refractive index of the particles ($n_P$) was measured by Becke line detection method (or immersion method). The refractive index of the binder matrix ($n_B$) was measured in the following way: A coating liquid made of the binder matrix (free from the particles) and the solvent was coated on a film and dried. Then, after it was cured by ultraviolet ray, the refractive index was measured by Becke line detection method (or immersion method).

Example 2-9, Comparative Example 1-9

Each antiglare film of example 2-9 and comparative example 1-9 was produced changing specific factors, i.e. the copolymerization ratio (by weight) between styrene and methyl methacrylate of the particles, the average diameter of the particles (R), the average thickness of the antiglare layer (H), and the amount of the particles ($w_P$), from those in example 1. Each antiglare film of the example 2-9 and comparative example 1-9 was produced using the same binder matrix forming material (the acrylic material, the photopolyerization initiator and the surface conditioner) and solvent as the antiglare of example 1. Moreover, each antiglare film of the example 2-9 and comparative example 1-9 was produced under the same conditions (such as using the same coating machine, the same drying condition and the same exposure condition to ultraviolet light) as the antiglare film of example 1 except for changing an amount of coating liquid so as to change and control an average thickness of the antiglare layer (H).

Table 1 shows copolymerization ratios by weight of the particles made from styrene and methyl methacrylate, average diameters of the particles (R), average thicknesses of the antiglare layer (H), contents of the particles ($W_P$), and refractive indexes of the particles ($n_P$) and the binder matrix ($n_B$).

TABLE 1

|  | Copolymerization ratio by weight of styrene:MMA | Average diameter of particles R (μm) | Average thickness of antiglare layer H (μm) | Content of particles $w_F$ (parts by weight) | Refractive index of particles $n_F$ | Refractive index of binder matrix $n_B$ |
|---|---|---|---|---|---|---|
| Example 1 | 70:30 | 4.2 | 7.6 | 9.2 | 1.56 | 1.53 |
| Example 2 | 70:30 | 3.0 | 6.5 | 9.2 | 1.56 | 1.53 |
| Comparative example 1 | 70:30 | 3.0 | 7.0 | 9.2 | 1.56 | 1.53 |
| Example 3 | 70:30 | 4.2 | 6.6 | 9.2 | 1.56 | 1.53 |
| Comparative example 2 | 70:30 | 4.2 | 6.2 | 9.2 | 1.56 | 1.53 |
| Example 4 | 70:30 | 4.2 | 7.6 | 8.0 | 1.56 | 1.53 |

TABLE 1-continued

|  | Copolymerization ratio by weight of styrene:MMA | Average diameter of particles R (μm) | Average thickness of antiglare layer H (μm) | Content of particles $w_F$ (parts by weight) | Refractive index of particles $n_F$ | Refractive index of binder matrix $n_B$ |
|---|---|---|---|---|---|---|
| Comparative example 3 | 70:30 | 4.2 | 7.6 | 7.8 | 1.56 | 1.53 |
| Example 5 | 70:30 | 4.2 | 7.6 | 10.4 | 1.56 | 1.53 |
| Comparative example 4 | 70:30 | 4.2 | 7.6 | 10.8 | 1.56 | 1.53 |
| Comparative example 5 | 30:70 | 4.2 | 7.6 | 9.2 | 1.52 | 1.53 |
| Example 8 | 60:40 | 4.2 | 7.6 | 9.2 | 1.55 | 1.53 |
| Comparative example 8 | 50:50 | 4.2 | 7.6 | 9.2 | 1.54 | 1.53 |
| Example 9 | 80:20 | 4.2 | 7.6 | 9.2 | 1.57 | 1.53 |
| Comparative example 9 | 90:10 | 4.2 | 7.6 | 9.2 | 1.58 | 1.53 |

The antiglare film obtained in example 1-9 and comparative example 1-9 was evaluated whether the film made an image of external light blurred or not when external light fell in the film ("antiglare property" evaluation) and whether the film whitened or not when an illumination of fluorescent lamp was reflected on the film ("white-blurring" evaluation). The evaluation was performed in the following way "Antiglare Property" Evaluation The antiglare films obtained in example 1-9 and comparative example 1-9 were pasted on a black plastic plate with tackiness agent and light from fluorescent lamp was reflected on the films. The sharpness of an image of the fluorescent lamp was visually evaluated. The result was expressed as follows. Double circle: The image of the fluorescent lamp was completely blurred and could not be recognized. Circle: The image of the fluorescent lamp was sufficiently blurred. Cross: The image of the fluorescent lamp was significantly observed.

"White-Blurring" Evaluation

The antiglare films obtained in example 1-9 and comparative example 1-9 were pasted on a black plastic plate with tackiness agent and light from fluorescent lamp was reflected on the films. Light diffusions by the antiglare films were visually evaluated. The result was expressed as follows. Double circle: Light diffusion by the antiglare film was very small so that the film was not whitened at all. Circle: Light diffusion by the antiglare film was small so that the film was not largely whitened. Cross: The film was whitened to an unacceptable level.

Results on "Antiglare property" evaluation and "White-blurring" evaluation of the antiglare films obtained in examples and comparative examples are illustrated in Table 2 as well as copolymerization ratios by weight of the particles made from styrene and methyl methacrylate, the quotients (R/H) obtained by dividing the average diameters of the particles (R) by the average thicknesses of the antiglare layer (H), and the quotients ($W_F/W_B$) obtained by dividing the contents of the organic particles ($W_P$) by the contents of the acrylic binder matrix ($W_B$).

TABLE 2

|  | Copolymerization ratio by weight of styrene:MMA | R/H | $w_F/w_B$ | White-blurring | Antiglare property |
|---|---|---|---|---|---|
| Example 1 | 70:30 | 0.55 | 0.092 | ⊚ | ⊚ |
| Example 2 | 70:30 | 0.46 | 0.092 | ⊚ | ○ |

TABLE 2-continued

|  | Copolymerization ratio by weight of styrene:MMA | R/H | $w_F/w_B$ | White-blurring | Antiglare property |
|---|---|---|---|---|---|
| Comparative example 1 | 70:30 | 0.43 | 0.092 | ⊚ | X |
| Example 3 | 70:30 | 0.64 | 0.092 | ○ | ⊚ |
| Comparative example 2 | 70:30 | 0.68 | 0.092 | X | ⊚ |
| Example 4 | 70:30 | 0.55 | 0.080 | ⊚ | ○ |
| Comparative example 3 | 70:30 | 0.55 | 0.078 | ⊚ | X |
| Example 5 | 70:30 | 0.55 | 0.104 | ○ | ⊚ |
| Comparative example 4 | 70:30 | 0.55 | 0.108 | X | ⊚ |
| Comparative example 5 | 30:70 | 0.55 | 0.092 | ⊚ | X |
| Example 8 | 60:40 | 0.55 | 0.092 | ⊚ | ○ |
| Comparative example 8 | 50:50 | 0.55 | 0.092 | ⊚ | X |
| Example 9 | 80:20 | 0.55 | 0.092 | ○ | ⊚ |
| Comparative example 9 | 90:10 | 0.55 | 0.092 | X | ⊚ |

The antiglare films of example 1-9 attained better properties such as high level of antiglare properties and free from white-blurring than the films of comparative example 1-9.

In addition, the antiglare films of example 1-9 were visually checked changes in appearance such as abrasions or scratches after they were rubbed 10 laps with a steel wool (#0000) under 500 g/cm³ of load. Since no changes were observed then, it was confirmed that the antiglare films of example 1-9 have sufficient hardness on the surface.

Moreover, the antiglare films of example 1-9 also received peeling test. After being cut grid-like slits on the surface (10 grids by 10 grids, size of a grid is 1 mm square), the antiglare films were attached with a cellophane adhesive tape over the entire surface and the tape was peeled off. If adhesiveness between the triacetyl cellulose film and the antiglare layer of the antiglare film was weak, the cellophane tape was peeled off with some grids of the surface of the antiglare film still attached. In the antiglare films of example 1-9, however, no grids of the surface peeled off and it was confirmed that there was sufficient adhesiveness between the triacetyl cellulose film and the antiglare layer.

Example 10

The antiglare film obtained in example 1 received an alkali treatment steeped in 1.5N—NaOH aqueous solution for 2 minutes at 50° C. After washed with water, the film was neutralized steeped in 0.5 weight %-$H_2SO_4$ aqueous solution for 30 seconds at room temperature, washed with water and dried. Meanwhile, 5 parts by weight of oligomer, which were obtained by hydrolyzing a silicon alkoxide (specifically, tetraethoxy silane) by 1 mol/L of hydrochloric acid, and 5 parts by weight of silica particles with low refractive index were mixed and diluted with 190 parts by weight of isopropanol to prepare a coating liquid for forming a low refractive index layer. The obtained coating liquid for forming a low refractive index layer was coated on the alkali treated antiglare layer with a coating machine having a die coater so that the thickness of the low refractive index layer after drying became 100 nm. As a result, an antireflection layer as a functional layer was formed on the antiglare layer. The antiglare film having an antireflection layer described above was free from in-plane unevenness, and show good antiglare property and little whitening as well as excellent antireflection property.

What is claimed is:

1. An antiglare film comprising:
    a transparent substrate; and
    an antiglare layer including a binder matrix and particles in said binder matrix, said antiglare layer being on said transparent substrate, said binder matrix having an acrylic material and cured by exposure to ionizing radiation, said particles being made of a copolymer of styrene and methyl methacrylate having copolymerization ratio by weight of styrene:methyl methacrylate in the 60:40-80:20 range, a quotient R/H obtained by dividing an average diameter of said particles (R) by an average thickness of said antiglare layer (H) being in the 0.45-0.65 range, a quotient $w_P/w_B$, obtained by dividing a content of said particles in said antiglare layer ($w_P$) by a content of said binder matrix in said antiglare layer ($w_B$) being in the 0.080-0.104 range.

2. The antiglare film according to claim 1, wherein said average thickness of said antiglare layer (H) is in the 3-30 μm range.

3. The antiglare film according to claim 1, wherein said acrylic material includes 3-functional acrylate (or methacrylate) monomers and/or 4-functional acrylate (or methacrylate) monomers, and more than or equal to 80 parts by weight of said 3-functional acrylate (or methacrylate) monomers and/or said 4-functional acrylate (or methacrylate) monomers relative to 100 parts by weight of said binder matrix.

4. The antiglare film according to claim 1, wherein an antireflection layer is arranged on said antiglare layer.

5. A manufacturing method of an antiglare film having particles in a binder matrix on a transparent substrate comprising:
    a process of coating a coating liquid for forming an antiglare layer to form a coated film on said transparent substrate in such a way that an average thickness of said coated film (H) which is measured after said coated film is made to an antiglare layer and an average diameter of said particles (R) satisfies a condition that a quotient R/H is in the 0.45-0.65 range, said coating liquid for forming an antiglare layer containing a binder matrix forming material, particles and a solvent, said particles being made of a copolymer of styrene and methyl methacrylate and satisfying a condition that a copolymerization ratio by weight of syrene:methyl methacrylate is in the 60:40-80:20 range, said coating liquid for forming an antiglare layer having a content of said particles ($w_P$) and a content of said binder matrix ($w_B$) which satisfies a relation that a quotient $w_P/w_B$ is in the 0.080-0.104 range;
    a process of drying to remove said solvent; and
    a process of exposing said coated film to ionizing radiation to cure said binder matrix forming material.

6. The manufacturing method of an antiglare film according to claim 5, wherein said average thickness of the antiglare layer (H) is in the 3-30 μm range.

7. The manufacturing method of an antiglare film according to claim 5, wherein said transparent substrate is a triacetyl cellulose film, and said solvent, which is used in said coating liquid for forming said antiglare layer, includes two solvents in which triacetyl cellulose film is dissolved or swollen and in which triacetyl cellulose film is not dissolved or swollen.

8. The manufacturing method of an antiglare film according to claim 5, wherein said process of exposing said coated film to ionizing radiation to cure said binder matrix forming material is performed under an atmosphere of oxygen concentration less than (or equal to) 2.0%.

* * * * *